April 1, 1969     K. C. BUSHWAY ET AL     3,435,734

AIRBRAKE DIAPHRAGM

Filed July 12, 1966

INVENTORS
KENNETH C. BUSHWAY
NICHOLAS V. RISELLI
BY
ATTY.

United States Patent Office 3,435,734
Patented Apr. 1, 1969

3,435,734
AIRBRAKE DIAPHRAGM
Kenneth C. Bushway, Waltham, and Nicholas V. Riselli, Belmont, Mass., assignors to The B. F. Goodrich Company, New York, N.Y., a corporation of New York
Filed July 12, 1966, Ser. No. 564,678
Int. Cl. F16j 3/00
U.S. Cl. 92—103                                                          6 Claims

ABSTRACT OF THE DISCLOSURE

A flexible resilient brake diaphragm for fluid pressure operated braking systems has a dish-shaped configuration that contains a central portion which includes a generally planar center section and sloping sides which together form a generally frusto-conical component. The sloping side of the central portion join to an outwardly extending peripheral flange useful for securing the diaphragm in place within the braking system. The exterior surface of the shoulder of the diaphragm (formed at the juncture of the generally planar center section of the central portion of the diaphragm with the sloping sides of the central portion of the diaphragm) is provided with a stippled surface formed by small protuberances on the exterior surface of the shoulder. Spaced ribs may be provided along the inner surface of the shoulder of the diaphragm to impart a greater degree of rigidity at the shoulder. The peripheral flange of the diaphragm desirably increases in thickness as the flange extends outwardly from the central portion of the diaphragm.

---

Figure 1:
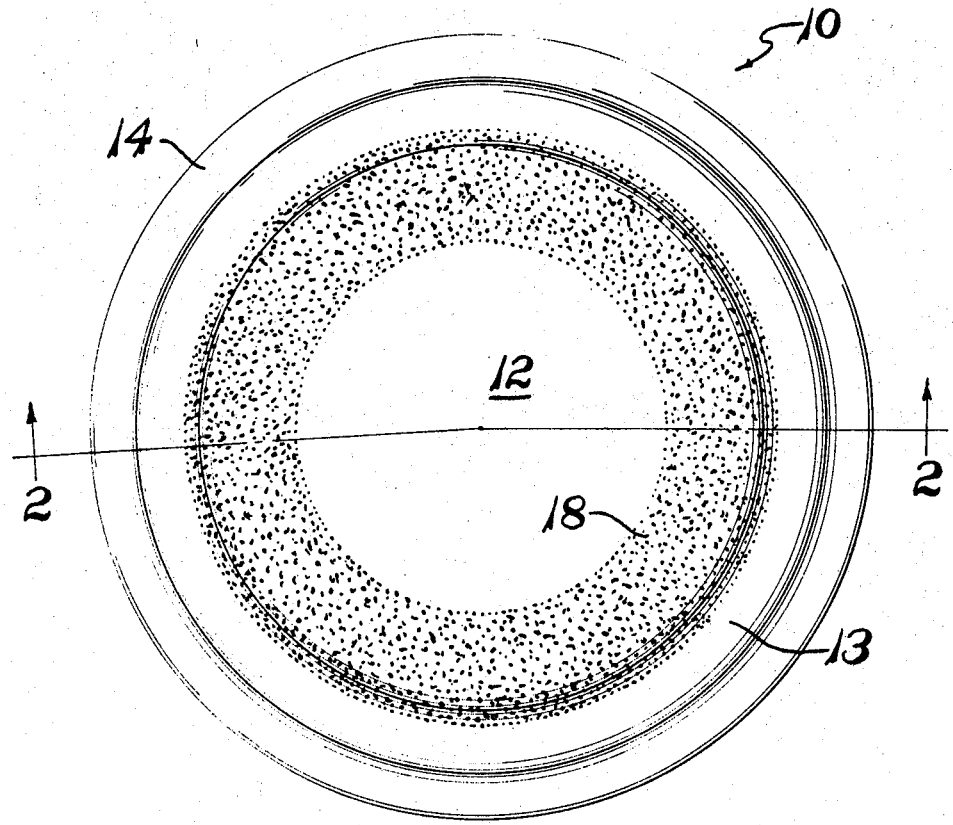

This invention relates to flexible brake diaphragms and pertains more particularly to flexible resilient brake diaphragms employed in fluid pressure operated devices used in vehicle braking systems.

In connection with braking systems for tractor-trailer vehicles it is customary to employ an airbrake system for stopping the trailer portion of the train. In addition, the tractor of the train also may be braked by use of an airbrake system, either as the sole braking system or in conjunction with a hydraulic braking system. Various components of the airbrake system are activated by a fluid pressure device in which a flexible resilient brake diaphragm is employed. Illustrations of certain such fluid pressure devices are described in United States Patents Nos. 2,160,565; 2,844,003 and 2,897,653. In general, the flexible brake diaphragm is displaced from a normal biased position by a differential in the air pressure exerted against the faces of the diaphragm and is returned to its normal biased position by a spring which has been compressed as a result of the initial displacement of the diaphragm.

The flexible resilient diaphragm usually is a molded rubber member that has a generally dish-shaped configuration, i.e. it has a central portion that has a generally concavo-convex contour and a peripheral flange portion intended to be confined between and held firmly in place by opposing sections of the housing of the fluid pressure motor or valve device. The concavo-convex central portion of the diaphragm generally is formed with a generally planar center section and sloping sides. The peripheral flange portion of the diaphragm also may be provided with spaced holes therethrough that register with holes provided in the opposing sections of the housing between which the peripheral flange portion is to be positioned so that securing bolts can be passed through the flange portion of the diaphragm when securing the opposing housing sections together. In the alternative, the flange portion of the diaphragm merely may be held firmly by the bite of the opposing housing sections as they are drawn and clamped together. The molded rubber diaphragm, in addition, usually is provided with a fabric reinforcing layer embedded in the rubber matrix of the diaphragm to provide additional strength to the diaphragm.

In the molding of the flexible rubber diaphragm, difficulty often is experienced in the formation of the shoulder of the diaphragm that separates the generally planar central region of the concavo-convex portion from the sloping sides of the concavo-convex portion since the rubber composition has a tendency not to flow as desired in this region. Defects in the shoulder of the diaphragm heretofore often have occurred because of the poor flow characteristics of the rubber composition in this region, which defects have resulted in the premature failure of the diaphragm.

The present invention has eliminated the difficulties heretofore experienced in the molding of the rubber diaphragms and the resulting defects. In accordance with this invention, the external surface of the shoulder of the rubber diaphragm is provided with a molded stippled surface by appropriately engraving the surface of the mold cavity which forms the exterior surface of the shoulder of the diaphragm. The provision of the roughened surface along the region of the exterior surface of the shoulder of the diaphragm apparently improves the flow characteristics of the rubber composition from which the diaphragm is molded and improves the "knitting" of the rubber composition in this region thereby eliminating shoulder defects in the product. A longer service life for the diaphragm results.

Figure 2:
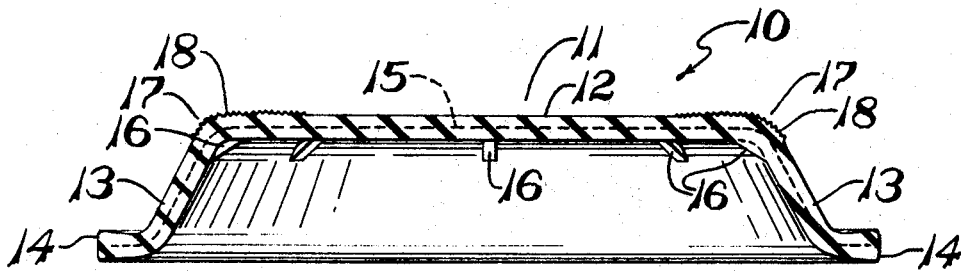

The invention will be more fully understood from the following description of an embodiment of this invention and by referring to the drawing in which:

FIG. 1 is a plan view of a flexible rubber brake diaphragm embodying the present invention; and FIG. 2 is a section on line 2—2 of FIG. 1.

As shown in the drawing, the flexible brake diaphragm 10 has a generally dish-shaped configuration comprised of a concavo-convex central portion 11 which includes a generally planar center section 12 and sloping sides 13 that together form a generally frusto-conical configuration. Sloping sides 13 join to an outwardly extending peripheral flange 14 that is intended to be firmly engaged by opposing sections of the housing of the fluid pressure device in which the diaphragm 10 is utilized and held in place thereby. As shown in FIG. 2, the peripheral flange 14 desirably increases in thickness as the flange 14 extends outwardly to facilitate the retention of the diaphragm 10 between the opposing clamped housing sections. As indicated above, the peripheral flange 14 can be provided with holes (not shown) through the thickness thereof spaced around the periphery of the diaphragm 10 through which clamping bolts can be threaded. A fabric layer 15 embedded within the rubber matrix of the wall of the diaphragm 10 provides reinforcement and additional strength to the diaphragm 10. Reinforcing buttresses or ribs 16 are provided and spaced along the inner surface of the shoulder 17 of the diaphragm, which shoulder is formed by the juncture of the generally planar center section 12 with the sloping sides 13 of the concavo-convex central portion of the diaphragm 10. The buttresses or ribs 16 produce a greater rigidity at the shoulder 17 of the diaphragm 10 than would be present if such supporting elements are not provided.

In accordance with the present invention, the exterior surface of the diaphragm is provided with a stippled surface formed of small protuberances 18, such as knurls or beads, along the area of the shoulder 17 of the diaphragm 10, which roughened surface not only improves the appearance of the diaphragm but also provides improved service life for the diaphragm. The protruding knurls or beads 18 are readily formed in the exterior surface of the diaphragm 10 during the molding of the diaphragm by merely engraving the surface of the mold cavity which will form the exterior surface of the shoulder of the diaphragm with appropriately shaped indentations.

The diaphragm 10 is made in the conventional manner for molding diaphragms of this type which is well known in the art. The rubber composition which is employed is not critical and may be comprised of natural rubber or synthetic rubber or combinations thereof. If a fabric reinforcing layer is employed, it may be formed of any fiber which is not objectionably affected by the heat required to vulcanize the rubber composition. A nylon fabric layer provides excellent reinforcement.

The provision of the stippled surface need not be restricted merely to the exterior surface of the shoulder of the diaphragm but may extend over a larger area and may even extend over the entire exterior surface of the concavo-convex portion of the diaphragm.

We claim:

1. A flexible resilient brake diaphragm intended for use in a fluid pressure operated braking system, said diaphragm having a generally frusto-conical shaped central portion which includes a generally planar center section and sloping sides and which joins to an outwardly extending peripheral flange, the exterior surface of the shoulder of said diaphragm formed at the juncture of the generally planar center section of said frusto-conical shaped central portion with the sloping sides of said frusto-conical shaped central portion being provided with a stippled surface formed by small protuberances disposed over the exterior surface of said shoulder.

2. The brake diaphragm of claim 1 in which said peripheral flange increases in thickness as the flange extends outwardly.

3. The brake diaphragm of claim 1 in which spaced ribs are provided along the inner surface of the shoulder of the diaphragm to provide greater rigidity at the said shoulder.

4. The brake diaphragm of claim 1 in which the wall of the diaphragm is reinforced with an embedded layer of fabric.

5. The brake diaphragm of claim 2 in which spaced ribs are provided along the inner surface of the shoulder of the diaphragm to provide greater rigidity at the said shoulder.

6. The brake diaphragm of claim 5 in which the wall of the diaphragm is reinforced with an embedded layer of fabric.

References Cited

UNITED STATES PATENTS

| 1,793,621 | 2/1931 | Kelley | 92—104 |
| 2,684,829 | 7/1954 | McFarland | 92—103 X |
| 3,011,758 | 12/1961 | McFarland | 92—104 X |
| 3,135,173 | 6/1964 | Jack | 92—103 |
| 3,340,734 | 9/1967 | St. Clair et al. | 92—104 |

FOREIGN PATENTS 547,485  8/1942  Great Britain.

MARTIN P. SCHWADRON, *Primary Examiner.*

I. C. COHEN, *Assistant Examiner.*